United States Patent
Schroedle et al.

(10) Patent No.: US 9,209,461 B2
(45) Date of Patent: Dec. 8, 2015

(54) PROCESS FOR THE PREPARATION OF LIFEPO₄-CARBON COMPOSITES

(75) Inventors: Simon Schroedle, Ludwigshafen (DE); Hartmut Hibst, Schriesheim (DE); Brian Roberts, South Euclid, OH (US); Kirill Bramnik, Jersey City, NJ (US); Jordan Keith Lampert, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 756 days.

(21) Appl. No.: 13/379,048

(22) PCT Filed: Jun. 23, 2010

(86) PCT No.: PCT/EP2010/058868
§ 371 (c)(1),
(2), (4) Date: Dec. 19, 2011

(87) PCT Pub. No.: WO2010/149681
PCT Pub. Date: Dec. 29, 2010

(65) Prior Publication Data
US 2012/0097901 A1 Apr. 26, 2012

Related U.S. Application Data

(60) Provisional application No. 61/219,802, filed on Jun. 24, 2009.

(51) Int. Cl.
| | | |
|---|---|---|
| *H01B 1/24* | (2006.01) | |
| *H01M 4/525* | (2010.01) | |
| *H01M 4/58* | (2010.01) | |
| *C01B 25/45* | (2006.01) | |
| *C01B 25/455* | (2006.01) | |
| *H01M 4/131* | (2010.01) | |
| *H01M 4/1315* | (2010.01) | |
| *H01M 4/133* | (2010.01) | |
| *H01M 4/485* | (2010.01) | |
| *H01M 4/505* | (2010.01) | |
| *H01M 4/583* | (2010.01) | |
| *H01M 10/0525* | (2010.01) | |

(52) U.S. Cl.
CPC ............. *H01M 4/5825* (2013.01); *C01B 25/45* (2013.01); *C01B 25/455* (2013.01); *H01B 1/24* (2013.01); *H01M 4/131* (2013.01); *H01M 4/133* (2013.01); *H01M 4/1315* (2013.01); *H01M 4/485* (2013.01); *H01M 4/505* (2013.01); *H01M 4/525* (2013.01); *H01M 4/583* (2013.01); *H01M 10/0525* (2013.01); *Y02E 60/122* (2013.01)

(58) Field of Classification Search
CPC . H01M 10/0525; H01M 4/485; H01M 4/525; H01M 4/131; H01B 1/24; H01B 1/04; H01B 1/18
USPC .................. 252/182.1, 506; 429/231.95, 221
See application file for complete search history.

(56) References Cited

U.S. PATENT DOCUMENTS

| | | | |
|---|---|---|---|
| 6,702,961 B2 | 3/2004 | Barker et al. | |
| 6,913,855 B2 * | 7/2005 | Stoker et al. | ............. 429/231.95 |
| 6,962,666 B2 | 11/2005 | Ravet et al. | |
| 2003/0082454 A1 | 5/2003 | Armand et al. | |
| 2004/0013943 A1 | 1/2004 | Stoker et al. | |
| 2007/0190425 A1 | 8/2007 | Barker et al. | |

(Continued)

FOREIGN PATENT DOCUMENTS

| | | |
|---|---|---|
| CN | 1547273 | 11/2004 |
| CN | 101121509 A | 2/2008 |

(Continued)

OTHER PUBLICATIONS

International Search Report Issued Nov. 2, 2010 in PCT/EP10/058868 Filed Jun. 23, 2010.
U.S. Appl. No. 13/370,927, filed Feb. 10, 2012, Schulz-Dobrick, et al.
U.S. Appl. No. 13/396,112, filed Feb. 14, 2012, Bayer, et al.
Office Action issued Jul. 15, 2015, in Chinese Patent Application No. 201080028061.9 (English-language Translation).
Ying Li, "Study of the Synthesis and Modification of Cathode Material LiFePO4 of Li-ion Battery," *Chinese Selected Master's Theses Databases*, pp. 1-5, Dec. 2007. Only English-language abstract is considered.

(Continued)

*Primary Examiner* — Khanh Tuan Nguyen
*Assistant Examiner* — Haidung Nguyen
(74) *Attorney, Agent, or Firm* — Oblon, McClelland, Maier & Neustadt, L.L.P.

(57) ABSTRACT

The present invention relates to a process for the preparation of particles comprising at least one compound according to general formula (I) $M^1aM^2bM^3cOoNnFf$ (I) wherein $M^1$, $M^2$, $M^3$ O, N, F, a, b, c, o, n and f have the following meanings: M1 at least one alkaline metal, M2 at least one transition metal in oxidation state +2, M3 at least one non-metal chosen form S, Se, P, As, Si, Ge and/or B, O oxygen, N nitrogen, F fluorine, a 0.8-4.2, b 0.8-1.9, c 0.8-2.2, o 1.0-8.4, n 0-2.0 and f 0-2.0, wherein a, b, c, o, n and f are chosen to ensure electroneutrality of the compound according to general formula (I), and carbon, comprising at least the following steps: (A) providing an essentially aqueous mixture comprising at least one compound comprising $M^1$, at least one compound comprising $M^2$ having at least partially an oxidation state higher than +2, optionally at least one compound comprising $M^3$, at least one compound comprising N, if present, and/or at least one compound comprising F, if present, at least one polysaccharide comprising glucose having a molecular weight M of at least 50000 g/mol as carbon precursor and at least one reducing agent, (B) drying the mixture provided in step (A), in order to obtain a solid particle and (C) calcining the solid particle obtained from step (B) at a temperature of 300 to 950° C.

10 Claims, No Drawingse

(56) References Cited

U.S. PATENT DOCUMENTS

| | | |
|---|---|---|
| 2009/0045374 A1 | 2/2009 | Lawrenz et al. |
| 2009/0117022 A1 | 5/2009 | Nuspl et al. |
| 2009/0233096 A1 | 9/2009 | Schall et al. |
| 2010/0283012 A1 | 11/2010 | Hibst et al. |
| 2010/0301281 A1 | 12/2010 | Hibst et al. |
| 2011/0037032 A1 | 2/2011 | Hibst et al. |
| 2011/0049443 A1 | 3/2011 | Hibst et al. |
| 2011/0084238 A1 | 4/2011 | Hibst et al. |
| 2011/0147671 A1 | 6/2011 | Bramnik et al. |
| 2012/0012797 A1 | 1/2012 | Bramnik et al. |

FOREIGN PATENT DOCUMENTS

| | | | |
|---|---|---|---|
| CN | 101154722 A | * | 4/2008 |
| CN | 101179124 A | | 5/2008 |
| CN | 101200289 | | 6/2008 |
| CN | 10133995 A | | 1/2009 |
| CN | 100502103 C | | 6/2009 |
| DE | 10 2005 012 640 | | 9/2006 |
| DE | 10 2005 015 613 | | 10/2006 |
| JP | 2004-509058 A | | 3/2004 |
| JP | 2004-509447 A | | 3/2004 |
| WO | 2006 057146 | | 6/2006 |
| WO | WO 2008/093551 A1 | | 8/2008 |
| WO | WO 2009/043730 | | 4/2009 |
| WO | WO 2009/071332 A2 | | 6/2009 |
| WO | 2009 127672 | | 10/2009 |
| WO | 2010 023194 | | 3/2010 |
| WO | WO 2010/148114 A1 | | 12/2010 |

OTHER PUBLICATIONS

Office Action issued Aug. 25, 2015, in corresponding Japanese Patent Application No. 516703/2012.

* cited by examiner

PROCESS FOR THE PREPARATION OF LIFEPO₄-CARBON COMPOSITES

The present invention relates to a process for the preparation of particles comprising at least one compound comprising a first metal, for example lithium, a second metal, for example iron, and at least one anion, for example phosphate-anion, and carbon, to particles preparable by this process and the use of these particles for the preparation of cathodes of lithium ion batteries.

Processes for the preparation of particles comprising LiFePO₄ and optionally carbon are already known from the prior art.

US 2003/0082454 A1 discloses a method for preparing LiFePO₄ by mixing $Li_2CO_3$ or $LiOH.H_2O$, $Fe(CH_3CO_2)_2$ and $NH_4H_2PO_4.H_2O$. The solid mixture is calcined at 300 to 350° C., in order to eliminate $NH_3$, $H_2O$ and $CO_2$. The mixture is subsequently further processed under argon for 24 hours at 800° C. This document further mentions the method of preparing LiFePO₄ based material by calcination of a milled mixture comprising $Li_2C_2O_4$, $LiH_2PO_4$ and $Fe(C_2O_4).2H_2O$.

U.S. Pat. No. 6,962,666 B2 discloses a method for preparation of LiFePO₄ comprising a carbon-comprising coating, by calcination of a milled mixture consisting of 3% by weight of polypropylene-powder, $Fe_3(PO_4)_2.8H_2O$ and $Li_3PO_4$ under argon. The mixture is calcined at 300° C. for 3 hours under argon to dehydrate $Fe_3(PO_4)_2.8H_2O$ and is subsequently calcined for 7 hours at 700° C. The polypropylene-powder is a reducing agent to reduce Fe(III) in $Fe_3(PO_4)_2.8H_2O$ to Fe(II) in LiFePO₄ and to produce carbon at the same time.

U.S. Pat. No. 6,702,961 B2 also discloses a method for the preparation of LiFePO₄ by pelletising a milled mixture consisting of FePO₄, $Li_2CO_3$ and carbon, followed by calcination at 700° C. for 8 hours in an inert atmosphere.

The abstract of CN 1547273 A discloses a method for the preparation of LiFePO₄ by calcination of a milled and subsequently tablettized mixture of $Li_2CO_3$, $FeC_2O_4.2H_2O$ and $(NH_4)_2HPO_4$ with the addition of carbon under microwave radiation.

DE 10 2005 015613 A1 discloses that LiFePO₄ can be obtained by hydrothermal treatment of an essentially aqueous mixture comprising $FeSO_4.7H_2O$, $H_3PO_4$ and $LiOH.H_2O$ under nitrogen at 160° C. for 10 hours.

DE 10 2005 012 640 A1 discloses that LiFePO₄ can be obtained by hydrothermal treatment of precipitated $Fe_3(PO_4)_2.8H_2O$ with $Li_3PO_4$ and $Li_2SO_4$ at 160° C. for 10 hours.

WO 2006/057146 A2 discloses that LiFePO₄ can be obtained by melting a mixture comprising FeO, $P_2O_5$ and LiOH at 1100° C. under argon, followed by milling.

US 2004/0013943 discloses a process for the preparation of an active material for electrodes or batteries, in which a carbon containing reducing agent is added to a mixture comprising an alkali metal and a compound comprising a transition metal.

The processes for the preparation of particles comprising LiFePO₄ and carbon according to the prior art bear the drawback that the calcination step has to be conducted in a reducing atmosphere. Because carbon acts as a reducing agent only at high reaction temperatures, high calcination temperatures are necessary which lead to a material with large crystal grains and with a broad particle size distribution. Other disadvantages are that the solid compounds obtained from these known processes show a compacted bulk density and electrochemical characteristics that can still be improved.

The object of the present invention is to provide a process for the preparation of particles, comprising at least one compound comprising preferably lithium, iron and phosphate-anions and carbon, showing a high tap density and advantageous electrochemical characteristics. In addition, it is an object of the present invention to provide a process for the preparation of the mentioned particles which can be conducted easily and with only a few reaction steps.

These objects are achieved by a first process for the preparation of particles comprising at least one compound according to general formula (I)

$$M^1{}_aM^2{}_bM^3{}_cO_oN_nF_f \qquad (I)$$

wherein $M^1$, $M^2$, $M^3$ O, N, F, a, b, c, o, n and f have the following meanings:

$M^1$ at least one alkaline metal,
$M^2$ at least one transition metal in oxidation state +2,
$M^3$ at least one non-metal chosen form S, Se, P, As, Si, Ge and/or B,
O oxygen,
N nitrogen,
F fluorine,
a 0.8-4.2,
b 0.8-1.9,
c 0.8-2.2,
o 1.0-8.4,
n 0-2.0 and
f 0-2.0,
wherein a, b, c, o, n and f are chosen to ensure electroneutrality of the compound according to general formula (I), and carbon, comprising at least the following steps:

(A) providing an essentially aqueous mixture comprising at least one compound comprising $M^1$, at least one compound comprising $M^2$ having an oxidation state of at least partially higher than +2, optionally at least one compound comprising $M^3$, at least one compound comprising N, if present, and/or at least one compound comprising F, if present, at least one polysaccharide comprising glucose having a molecular weight M of at least 50000 g/mol as carbon precursor and at least one reducing agent, (B) drying the mixture in step (A), in order to obtain a solid particle and (C) calcining the solid particle obtained from step (B) at a temperature of 300 to 950° C.

These objects are further achieved by a second process for the preparation of particles comprising at least one compound according to general formula (I) as defined above and carbon, comprising at least the following steps:

(D) mixing at least one compound according to general formula (I) as defined above with an aqueous solution of at least one polysaccharide comprising glucose having a molecular weight M of at least 50000 g/mol as carbon precursor, (E) drying the mixture provided in step (A), in order to obtain a solid particle and (F) calcining the solid particle obtained from step (E) at a temperature of 300 to 950° C.

In the first process according to the present invention, particles comprising at least one compound according to general formula (I) and carbon are prepared from $M^1$-, $M^2$- and $M^3$-comprising precursors of general formula (I) and a specific polysaccharide by reduction. In the second process according to the present invention, particles comprising at least one compound according to general formula (I) and carbon are prepared by mixing compounds of general formula (I) and a specific polysaccharide.

The first process comprising at least steps (A) to (C) will be explained in the following:

The particles which are prepared by the first process according to the present invention, comprise at least one compound of general formula (I)

wherein $M^1$, $M^2$, $M^3$ O, N, F, a, b, c, o, n and f have the following meanings:

$M^1$ at least one alkaline metal,
$M^2$ at least one transition metal,
$M^3$ at least one non-metal chosen from S, Se, P, As, Si, Ge and/or B,
O oxygen,
N nitrogen,
F fluorine,
a 0.8-4.2,
b 0.8-1.9,
c 0.8-2.2,
o 1.0-8.4,
n 0-2.0 and
f 0-2.0, wherein a, b, c, o, n and f are chosen to ensure electroneutrality of the compound according to general formula (I). In general formula (I) $M^1$ and $M^2$ are metals and $M^3$ is a non-metal chosen from the mentioned group. Based on the presence of oxygen (O), the compounds according to general formula (I) are preferably sulphates, phosphates, arsenates, silicates, germinates and/or borates.

$M^1$ is at least one alkaline metal, for example chosen from the group consisting of Li, Na, K, Rb, Cs and mixtures thereof, preferably Li, Na and/or K, particularly preferred Li.

$M^2$ is at least one transition metal, for example chosen from the group consisting of Fe, Mn, Ni, Co and mixtures thereof, preferably Fe, Mn, Ni and/or Co, particularly preferred Fe.

$M^3$ is at least one non-metal chosen from S, Se, P, As, Si, Ge and/or B, preferably chosen from the group consisting of P, Si, S. Based on the presence of oxygen (O), the compounds according to general formula (I) are very preferably sulphates, phosphates, arsenates, silicates, germinates and/or borates.

In a preferred embodiment of the present process $M^1$, $M^2$, $M^3$ O, a, b, c, o, n and f in general formula (I) have the following meanings:

$M^1$ Li, and optionally at least one further alkaline metal,
$M^2$ Fe, Mn, Ni and/or Co, and optionally at least one further transition metal,
$M^3$ P, and optionally at least one further non-metal chosen from Si and/or S,
O oxygen,
a 0.8-1.9, particularly preferred 0.9 to 1.1, for example 1.0,
b 0.8-1.9, particularly preferred 0.9 to 1.1, for example 1.0,
c 0.8-1.9, particularly preferred 0.9 to 1.1, for example 1.0,
o 3.0-5.0, particularly preferred 3.5 to 4.5, for example 4.0, and
n, f 0.

In this preferred embodiment, n and f are 0, meaning that no nitrogen (N) and no fluorine (F) are present in the compound according to general formula (I).

For example, in a very preferred embodiment, $M^1$ is Li, $M^2$ is Fe, $M^3$ is P, and no further alkaline metal, no further transition metal and no further non-metal chosen from Si and/or S are present, in order to have a neutrally charged compound of general formula (I) $LiFePO_4$, in which Fe is in oxidation state +2. Therefore, in a very preferred embodiment, the compound according to general formula (I) is $LiFePO_4$.

In further preferred embodiments, $M^1$ is Li, $M^2$ is Mn, $M^3$ is P, and no further alkaline metal, no further transition metal and no further non-metal chosen from Si and/or S are present, in order to have a neutrally charged compound of general formula (I) $LiMnPO_4$, in which Mn is in oxidation state +2. Therefore, in a further preferred embodiment, the compound according to general formula (I) is $LiMnPO_4$.

Accordingly, further preferred compounds according to general formula (I) are $LiNiPO_4$ and $LiCoPO_4$.

In further preferred embodiments, in addition to $M^1$, being for example Li, at least one further alkaline metal, for example Na, is present in an amount of up to 10 mol %, in respect of the sum of $M^1$ and the at least one further alkaline metal.

In another preferred embodiment, in addition to $M^2$, being for example Fe, at least one further transition metal, for example Mn is present in an amount of up to 30 mol %, in respect of the sum of $M^2$ and the at least one further transition metal.

In another preferred embodiment, in addition to $M^3$, being for example P, at least one further non-metal chosen from Si and/or S is present in an amount of up to 10 mol %, in respect of the sum of $M^3$ and the at least one further non metal.

The particles which are prepared according to the present invention further comprise carbon. In general carbon is present in the particle according to the present invention in nonparticular form. In a preferred embodiment, carbon is predominantly present at the surface of the particles according to the present invention, particularly preferred carbon is present in a layer at the surface having a thickness of up to 20%, preferably up to 10%, of the diameter of the particles. In a preferred embodiment up to 80%, particularly preferred up to 90%, for example up to 95% of the carbon present in the particle, is present in the mentioned layer at the surface of the particle.

In the particles which are prepared by the process according to the present invention, carbon is in general present in an amount of from 0.5 to 10% by weight, preferably 1 to 6% by weight, and particularly preferred 3 to 5% by weight.

Process steps (A), (B) and (C) are explained in the following in detail:

Step (A):

Step (A) comprises (A) providing an essentially aqueous mixture comprising at least one compound comprising $M^1$, at least one compound comprising $M^2$ having an oxidation state of at least partially higher than +2, optionally at least one compound comprising $M^3$, at least one compound comprising N, if present, and/or at least one compound comprising F, if present, at least one polysaccharide comprising glucose having a molecular weight M of at least 50000 g/mol as carbon precursor and at least one reducing agent, The mixture which is provided in step (A) of the process according to the present invention is essentially aqueous, for example an essentially aqueous solution, dispersion or slurry.

In general, all $M^1$-, $M^2$- and $M^3$-comprising compounds known to a person having ordinary skill in the art which are able to be incorporated in the mixture in step (A) of the process can be used in the process according to the present invention.

In the preferred embodiment, wherein $M^1$ is Li, the lithium-comprising compound in step (A) is preferably chosen from the group consisting of lithium hydroxide LiOH, lithium hydroxide-hydrate $LiOH.H_2O$, lithium acetate LiOAc, lithium carbonate $Li_2CO_3$, lithium phosphates like $LiH_2PO_4$, $Li_2HPO_4$, $Li_3PO_4$, $LiH_2PO_3$, $Li_2HPO_3$, $Li_3PO_3$, $LiH_2PO_2$, and mixtures thereof. In a very preferred embodiment, lithium hydroxide LiOH and/or lithium hydroxide-hydrate $LiOH.H_2O$ and/or lithium carbonate $Li_2CO_3$ are used as lithium-comprising compounds in step (A) of the process according to the present invention. Two particularly preferred lithium-comprising compounds are lithium hydroxide LiOH and lithium hydroxide-hydrate $LiOH.H_2O$.

The at least one $M^1$-, preferably lithium-, comprising compound is added to the mixture in step (A) in the process according to the present invention in a concentration of in general 0.04 to 4 mol $M^1$/L, preferably 0.1 to 2.0 mol $M^1$/L, particularly preferred 0.2 to 1.5 mol $M^1$/L, based on the whole reaction mixture in each case.

Further $M^1$-comprising compounds, if present, are preferably chosen from the group consisting of sodium hydroxide NaOH, sodium hydroxide-hydrate $NaOH.H_2O$, sodium acetate NaOAc, sodium carbonate $Na_2CO_3$, and mixtures thereof. In a very preferred embodiment, sodium hydroxide NaOH and/or sodium hydroxide-hydrate $NaOH.H_2O$ and/or sodium carbonate $Na_2CO_3$ are used as sodium-comprising compounds in step (A) of the process according to the present invention. Two particularly preferred sodium-comprising compounds are sodium hydroxide NaOH and sodium hydroxide-hydrate $NaOH.H_2O$.

In the preferred embodiment, wherein $M^2$ is Fe, preferably iron-(III)-oxide hydroxide FeOOH is used as the $M^2$-containing compound. FeOOH is preferably chosen from the group consisting of α-FeOOH, β-FeOOH, γ-FeOOH and mixtures thereof. Preferred are the α-, and γ-modification of iron(III)-oxide hydroxide (FeOOH). α-FeOOH is especially preferred.

In a preferred embodiment, FeOOH is present in a needle-shaped habitus, particularly preferred having a ratio of length to thickness of >1.5, preferably >2, particularly preferred >5.

The advantage of the use of FeOOH, preferably in a needle-shaped habitus, is that in the mixture preferably comprising at least one lithium-comprising compound and at least one phosphorus comprising compound, very short diffusion pathways are present which make it possible to obtain the compound according to general formula (I) very homogeneously and in a single phase. The Fe(III)-cations can easily move between lithium and phosphorus atoms in order to reach the right places in the crystal, which is not that easy, if different Fe-containing compounds are used.

In a further embodiment, wherein $M^2$ is Mn, preferably $Mn_3O_4$, $NH_4MnPO_4.H_2O$, $Mn_2O_3$, $MnO_2$ or a mixture of two or more these compounds is used as the $M^2$-containing compound, particularly preferred $Mn_3O_4$. In addition, mixed hydroxides, oxides and carbonates of Mn-, Ni-, Co-, and/or Fe-salts can be used as the $M^2$-containing compound. These mixed compounds are preferably obtained by precipitating of the respective salts, preferably of the respective sulphates.

The at least one $M^2$-, preferably iron-, comprising compound is added to the mixture in step (A) in the process according to the present invention in a concentration of in general 0.04 to 4.0 mol $M^2$/L, preferably 0.1 to 2.0 mol $M^2$/L, particularly preferred 0.2 to 1.5 mol $M^2$/L, based on the whole reaction mixture in each case.

Further $M^2$-comprising compounds, if present, are preferably chosen from compounds having the required cation and an anion chosen from hydroxide, acetate, oxide, carbonate, halogenide, like fluoride, chloride, bromide, iodide, nitrate, and mixtures thereof. In a very preferred embodiment, the anion of the at least one $M^2$-comprising compound is acetate, oxide, hydroxide, carbonate, nitrate, or mixtures thereof.

In the preferred embodiment, wherein $M^3$ is P, preferred precursors comprise at least one phosphorus atom in oxidation state +5. These compounds are preferably chosen from the group consisting of $H_3PO_4$, $(NH_4)H_2PO_4$, $(NH_4)_2HPO_4$, $(NH_4)_3PO_4$, $Li_3PO_4$, $LiH_2PO_4$, $Li_2HPO_4$ and mixtures thereof. Particularly preferred is $H_3PO_4$.

The at least one $M^3$-comprising compound being preferably a compound comprising at least one phosphorus atom in oxidation state +5 is added to the mixture in step (A) in the process according to the present invention in a concentration of in general 0.04 to 4.0 mol $M^3$/L, preferably 0.1 to 2.0 mol $M^3$/L, particularly preferred 0.2 to 1.5 mol $M^3$/L, based on the whole reaction mixture in each case.

Further $M^3$-comprising compound, if present, are preferably chosen from $H_2SO_4$, $(NH_4)HSO_4$, $(NH_4)_2SO_4$, $LiHSO_4$, $Li_2SO_4$, finely divided $SiO_2$, e.g. in form of a sol, $H_4SiO_4$, Li-silicate, and mixtures thereof.

In general, $M^1$-, $M^2$-, and/or $M^3$-comprising compounds are added to the essentially aqueous mixture in amounts, in which they are present in compounds of formula (I). A person having ordinary skill in the art knows how to calculate the required amount.

The essentially aqueous mixture which is provided in step (A) of the process according to the present invention further comprises at least one polysaccharide comprising glucose having a molecular weight M of at least 50000 g/mol as carbon precursor.

In general, all suitable polysaccharides that fulfill the mentioned features can be used in step (A) of the process according to the present invention. Preferably the polysaccharide that is used in the process according to the present invention has a molecular weight M of at least 80000 g/mol, particularly preferred at least 150000 g/mol.

In a very preferred embodiment the at least one polysaccharide is amylopectin.

Amylopectin has in general a molar mass of 200.000 to 1.000.000 g/mol, corresponding about 1.200 to 6.200 D-glucose monomers, which are connected glycosidically in alpha-1,4-position with each other. In a distance of about 25 monomers, an alpha-1,6-glycosidic connection is present.

Amylopectin that is preferably used as carbon precursor in the process according to the present invention is in general used in a purity of at least 95%, preferably at least 96%, particularly preferred at least 98%.

Amylopectin can be obtained by all processes known to a person having ordinary skill in the art, for example by extraction from vegetables like potatoes, preferably from Amflora® potatoes. In a preferred embodiment amylopectin that is used in the process according to the present invention can be obtained from genetically modified vegetables, preferably potatoes.

The present invention further relates to the process according to the present invention, wherein at least one mono- and/or disaccharide is additionally added in step (A).

In a further embodiment of the process according to the present invention, in step (A) of the process according to the present invention, the at least one polysaccharide comprising glucose having a molecular weight M of at least 50000 g/mol is added in combination with at least one mono- and/or disaccharide as carbon precursor. In general all mono- and disaccharides that are known to the skilled artisan can be used in this embodiment. The at least one polysaccharide as mentioned above is in general present in the mixture with at least one mono- and/or disaccharide in an amount 25 to 95% by weight, preferably 30 to 90% by weight, most preferably 40 to 85% by weight, based in each case on the whole mixture of at least one polysaccharide and at least one mono- and/or disaccharide.

The at least one mono- and/or disaccharide is in general present in an amount of 5 to 75% by weight, preferably 10 to 70% by weight, most preferably 15 to 60% by weight, based in each case on the whole mixture of at least one polysaccharide and at least one mono- and/or disaccharide. The sum of the amounts of at least one polysaccharide and at least one mono- and/or disaccharide is 100% by weight in each case.

According to the present invention, if a mixture of at least one polysaccharide and at least one mono- and/or disaccharide is used, the at least one polysaccharide has to be present in an amount of at least 25% by weight, based on the whole mixture, in order to obtain particles having a suitable tap density.

Suitable mono- and/or disaccharides that can optionally be added in step (A) of the process of the present invention are preferably chosen form the group consisting of saccharose, lactose and mixtures thereof.

The mixture that is provided in step (A) of the process according to the present invention further comprises at least one reducing agent. In a preferred embodiment, the at least one reducing agent that is added in step (A) of the process according to the present invention, is water soluble. According to the present invention "water soluble" means that at least 50% of the reducing agent that is added to the essentially aqueous mixture is dissolved.

In a further preferred embodiment of the process according to the present invention, the at least one reducing agent is carbon free. According to the present invention, carbon free means that no carbon atoms in oxidation state 0 are present in the reducing agent. An advantage of a carbon free reducing agent is that the reduction can be conducted at low temperatures like 300 or 350° C., whereas carbon in elemental form as reducing agent makes temperatures of 600° C. and higher necessary. These low temperatures make it possible to obtain nano-crystalline materials. Nano-crystalline materials can not be obtained at high temperatures which are necessary if carbon is used as the reducing agent.

In a preferred embodiment of the process according to the present invention, the at least one reducing agent is chosen from the group consisting of hydrazine or derivatives thereof, hydroxyl amine or derivatives thereof, reducing sugars, alcohols, ascorbic acid, and compounds comprising easily oxidisable double bonds, compounds comprising phosphorus atoms in oxidation state +3, and mixtures thereof.

In a preferred embodiment, the at least one reducing agent which is carbon free and which is added in step (A) of the process according the present invention is preferably selected from the group consisting of hydrazine or derivatives thereof, hydroxyl amine or derivatives thereof. Examples of derivatives of hydrazine are hydrazine-hydrate, hydrazine-sulfate, hydrazine-dihydrochloride and others. An example of a derivative of hydroxyl amine is hydroxyl amine-hydrochloride. Particularly preferred carbon-free reducing agents are hydrazine, hydrazine-hydrate, hydroxyl amine or mixtures thereof.

In a particularly preferred embodiment of the present invention, the at least one reducing agent that is added in step (A) of the process according to the present invention is at least one reducing agent, which is oxidized to at least one compound comprising at least one phosphorus atom in an oxidation state +5 during the process according to the present invention. The use of at least one reducing agent, which is oxidized to at least one compound comprising at least one phosphorus atom in oxidation state +5 has the advantage that the oxidation product of this reducing agent gives rise to $PO_4^{3-}$-anions, which are needed in order to obtain the $PO_4^{3-}$-comprising compound of general formula (I), if $M^3$ is P. Therefore, in a very preferred embodiment of the present invention, if $M^3$ is P, at least one reducing agent is used, which is oxidized to at least one compound comprising at least one phosphorus atom in an oxidation state +5 during the process according to the present invention. In this preferred embodiment the reducing agent that is added in step (A) of the process according to the present invention and the at least one $M^3$-comprising compound are at least partially identical.

In a preferred embodiment, the at least one reducing agent that is oxidized to at least one compound comprising at least one phosphorus atom in oxidation state +5, is carbon free. According to the present invention, carbon free means that no carbon atoms are present in the phosphorus-containing reducing agent. The advantages of a carbon free reducing agent are mentioned above.

In a preferred embodiment, the at least one reducing agent which is oxidized to at least one compound comprising at least one phosphorus atom in an oxidation state +5 is chosen from the group consisting of $H_3PO_3$, $(NH_4)H_2PO_3$, $(NH_4)_2HPO_3$, $H_3PO_2$, $(NH_4)H_2PO_2$, $LiH_2PO_3$, $Li_2HPO_3$, $LiH_2PO_2$ and mixtures thereof. In a particularly preferred embodiment $H_3PO_3$, $(NH_4)H_2PO_3$, $(NH_4)_2HPO_3$ are used, a very preferred reducing agent is $H_3PO_3$.

The at least one reducing agent which is oxidized to at least one compound comprising at least one phosphorus atom in oxidation state +5 is added to the mixture in step (A) in the process according to the present invention in a concentration of in general 0.04 to 2.0 mol P/L, preferably 0.1 to 1.3 mol P/L, particularly preferred 0.15 to 1.0 mol P/L, for example 0.7 mol P/L, based on the whole reaction mixture in each case.

The reducing agent that is used in the process according to the present invention will preferably be oxidized to $PO_4^{3-}$. If the at least one reducing agent which is oxidized to at least one compound comprising at least one phosphorus atom in oxidation state +5 is added to the reaction mixture in a preferably at least equimolar amount, particularly preferred in an equimolar amount, $PO_4^{3-}$ is obtained as the oxidizing product in an amount high enough to be the complete amount of phosphate-anion $PO_4^{3-}$ of the compound of general formula (I), if $M^3$ is P. In this preferred case, no additional $M^3$-comprising compounds have to be added, in particular no compound having at least one phosphorus atom in oxidation state +5 has to be added.

In another preferred embodiment of the present application the mixture which is provided in step (A) comprises at least one compound comprising at least one phosphorus atom in oxidation state +5 as $M^3$-comprising compound in addition to at least one reducing agent which is oxidized to at least one compound comprising at least one phosphorus atom in oxidation state +5. In this preferred embodiment of the present invention a combination of at least one reducing agent which is oxidized to at least one compound comprising at least one phosphorus atom in oxidation state +5 and at least one compound comprising at least one phosphorus atom in oxidation state +5 as $M^3$-comprising compound is added to the reaction mixture in step (A) of the process according to the present invention. In this embodiment of the process according to the present application, $PO_4^{3-}$ that is obtained as the oxidizing product does not need to be present in an amount high enough to be the complete amount of phosphate-anion of the compound of general formula (I), because, in this embodiment, at least one compound having at least one phosphorus atom in oxidation stage +5 is also added as $M^3$-comprising compound. This at least one compound comprising at least one phosphorus atom in oxidation state +5 will be the second source of $PO_4^{3-}$-anions, which have to be incorporated into the compound of general formula (I).

Preferred compounds comprising at least one phosphorus atom in oxidation state +5 which are optionally added in step (A) as $M^3$-comprising compounds are chosen from the group consisting of $H_3PO_4$, $(NH_4)H_2PO_4$, $(NH_4)_2HPO_4$, $(NH_4)_3PO_4$, $Li_3PO_4$, $LiH_2PO_4$, $Li_2HPO_4$ and mixtures thereof. Particularly preferred are $H_3PO_4$, $(NH_4)H_2PO_4$, $(NH_4)_2HPO_4$ and mixtures thereof, very preferred is $H_3PO_4$.

The at least one compound comprising at least one phosphorus atom in oxidation state +5 is added to the mixture in step (A) in the process according to the present invention in a concentration of in general 0.04 to 2.0 mol P/L, preferably 0.1 to 1.3 mol P/L, particularly preferred 0.15 to 1.0 mol P/L, based on the whole reaction mixture in each case.

If compounds are used in the process according to the present invention that bear two functionalities in respect of the present process, like for example compounds that comprise a lithium-cation and a $PO_4^{3-}$- or $PO_3^{3-}$-anion, the amounts of the compounds, which are introduced into the reaction mixture, are adjusted in a way that all necessary components are present in the reaction mixture in amounts that are suitable for obtaining the compound according to general formula (I). A person having ordinary skill in the art does know how to calculate these amounts.

The at least one reducing agent is added to the mixture in step (A) in the process according to the present invention in a concentration of preferably 0.01 to 1.0 mol/mol $M^2$, being preferably Fe.

In a very preferred embodiment, the at least one lithium-comprising compound as $M^1$ comprising compound, FeOOH as $M^2$-comprising compound, optionally the at least one compound comprising at least one phosphorus atom in oxidation state +5 as $M^3$-comprising compound, and the at least one reducing agent comprising at least one phosphorus atom that is oxidized to oxidation state +5, are added to the, preferably essentially aqueous, mixture in amounts that are adjusted in a way that the stoichiometry according to general formula (I) is obtained. A person having ordinary skill in the art does know how to calculate the necessary amounts. In another preferred embodiment of the present invention, the at least one $M^1$-, preferably lithium-, comprising compound is added in an amount that is ≥1% by weight, preferably ≥2% higher, for example 2-5% higher, than the stoichiometric amount according to general formula (I).

The mixture which is provided in step (A) of the process according to the present invention is essentially aqueous. The wording "essentially" in this application has the meaning that more than 50% by weight, preferably more than 65% by weight, particularly preferably more than 80% by weight of the solvent, which is used to provide the essentially aqueous mixture in step (A) of the process according to the present invention, is water.

In addition to water, further solvents that are miscible with water can be present. Examples of these solvents are aliphatic alcohols having 1 to 10 carbon atoms like methanol, ethanol, propanols, for example n-propanol or iso-propanol, butanols, for example n-butanol, iso-butanol. According to the present invention, alcohols can be added as water soluble reducing agent and/or as additional solvent.

In a very preferred embodiment, the solvent that is used in step (A) of the process according to the present invention is water without any additional solvents. The solvent, preferably water, is added in amount that the mixture that is obtained in step (A) of the process according to the present invention is a slurry, a dispersion or preferably a solution.

The order, in which the different components are added to the solvent or mixture of solvents in step (A), is not determined. In a preferred embodiment, the $M^1$-comprising compound is added to the solvent first, the $M^2$-comprising compound is added as the second component. The at least one reducing agent and the at least one $M^3$-comprising compound are added subsequently, followed by the at least one polysaccharide.

In a preferred embodiment of the present invention, the mixture obtained from step (A) of the process according to the present invention is an essentially aqueous solution or dispersion of at least one lithium-comprising compound as $M^1$-comprising compound, FeOOH as the $M^2$-comprising compound, at least one compound comprising at least one phosphorus atom in oxidation state +5, being preferably $H_3PO_4$, as $M^3$-comprising compound, at least one water soluble reducing agent, being preferably $H_3PO_3$, and amylopectin.

Step (A) can be conducted in all suitable reactors that are known to a person skilled in the art. Step (A) can be conducted continuously or discontinuously.

The temperature, under which step (A) of the process according to the present invention is conducted is 10 to 120° C., preferably 60 to 100° C., particularly preferably 40 to 95° C. If temperatures higher than 100° C. are used, the essentially aqueous reaction mixture has to be present in a pressure-resistant reactor, because of the boiling point of water. To increase the homogeneity of the mixture, mixing is conducted at elevated temperature and optionally under the application of shearing force, for example by the use of an ultrathurax.

In a preferred embodiment the mixture is stirred in step (A) for a time of 0.05 to 80 hours, particularly preferred 0.5 to 20 hours. The pH-value of the mixtures to the end of stirring is in general below pH 11, preferably below pH 10, for example at pH 2.0 to 8.0.

Step (A) of the process according to the present invention can be conducted under air or under an inert atmosphere. Examples of inert gases are nitrogen, noble gases like helium or argon. In a preferred embodiment, step (A) is conducted under a nitrogen atmosphere.

Reduction of most of the $M^2$-precursor, being preferably $Fe^{3+}$ which is reduced to $Fe^{2+}$, is in general conducted in step (B) and/or step (C), preferably in step (C), of the process according to the present invention. It is also possible that reduction immediately starts in step (A) after addition of the reducing agent to the mixture. It is further possible that reduction starts after the essentially aqueous mixture is heated to an increased temperature of 40 to 100° C., preferably 60 to 95° C.

Step (B):

Step (B) of the process according to the present invention comprises (B) drying the mixture provided in step (A), in order to obtain a solid particle.

In step (B), the essentially aqueous mixture obtained from step (A) is converted into a solid compound. The drying of the mixture provided in step (A) of the process according to the present invention can be conducted with all methods known to a person having ordinary skill in the art and which are suitable for the removal of water of an essentially aqueous mixture of the components as mentioned above.

Preferred methods for drying the mixture from step (A) in step (B) are spray-drying, freeze-drying or combinations thereof. According to the present invention, the drying in step (B) can be conducted only by spray-drying, only by freeze-drying or by a combination of the spray-drying and freeze-drying, in both orders. Step (B) of the process according to the present invention is preferably conducted by spray-drying. Spray-drying in step (B) preferably causes that particles comprising at least one compound of general formula (I), preferably $LiFePO_4$, and carbon are obtained, in which carbon is preferably present in a layer at the surface of the particles.

Spray-drying is in general conducted by passing the mixture obtained from step (A) through one or more narrow nozzles, wherein fine drops are being obtained which are dried by a stream of hot air or nitrogen or hot mixtures of air, nitrogen, pure oxygen, argon, helium, hydrogen, preferably hot air or hot nitrogen or a hot mixture of air and nitrogen and optionally oxygen, particularly preferred hot air. Alternatively the spraying can be achieved via a rotating disc. In a preferred embodiment a stream of hot air or nitrogen is used having a temperature of 100 to 500° C., particularly preferred 110 to 350° C. Spray-drying is normally conducted directly with the mixture of step (A) without any intermediate steps.

Spray-drying normally gives rise to spherical agglomerates having an average diameter of <0.5 mm, e. g. 15-300 µm, preferably 20-200 µm, particularly preferred 30-150 µm. In order to obtain comparably small spherical agglomerates having an average diameter of 3-50 µm in a preferred embodiment of step (B) diluted solutions can be used and spray-drying of these diluted solutions can be conducted using high pressure nozzles. To increase the dilution of the solution, in general additional water is added.

In a second embodiment, step (B) of the process according to the present invention is conducted by freeze-drying. The sprayed mixture is therefore sprayed into, for example liquid nitrogen. The spherical particles and agglomerates obtained there from can be dried in vacuum at a low temperature.

The drying in step (B) is conducted in order to obtain a dry solid. In a preferred embodiment, the drying in step (B) of the process according to the present invention is conducted in order to obtain a solid having an amount of water present in the solid of less than 50% by weight, preferably less than 35% by weight, particularly preferably less than 25% by weight.

After step (B) the desired solid is present in preferably spherical particles having a diameter of 3 to 300 µm, preferably 6 to 200 µm, very preferably 6 to 150 µm, particularly preferably 8 to 40 µm.

Step (C):

Step (C) of the process according to the present invention comprises (C) calcining the solid particle obtained from step (B) at a temperature of 300 to 950° C.

Step (C) of the process according to the present invention is preferably conducted at a calcination temperature of 480 to 900° C., particularly preferably at a calcination temperature of 490 to 850° C., for example 650 to 750° C.

If calcination temperatures above 850° C., for example 950° C., are applied, at least a part of the particles which are obtained by the process according to the present invention decompose at least partially into primary particles, which are not desired. Therefore, in a preferred embodiment calcinations temperatures above 850° C. should be avoided.

Calcination is in general conducted under an inert gas atmosphere. Examples of inert gases are nitrogen, technical nitrogen comprising traces of oxygen or noble gases like helium and/or argon. In a preferred embodiment, nitrogen is used in step (C) of the process according to the present invention.

One advantage of the process according to the present invention is that calcination can be conducted under an inert atmosphere and no need exists to conduct step (C) under a gaseous reducing atmosphere according to the prior art. Based thereon the process according to the present invention can be conducted in a more time and cost saving way. The absence of a reducing agent, for example hydrogen, avoids the presence of explosive gaseous mixtures. If the nitrogen used in the calcination step comprises higher amounts of oxygen, it is possible to add reducing gases like CO or hydrogen to the oxygen comprising nitrogen.

Step (C) of the process according to the present invention is conducted for a time of 0.1 to 8 hours, preferably 0.5 to 3 hours. In a preferred embodiment of step (C), the calcination temperature is hold for a period of 0.1 to 2 hours, very preferably 0.5 to 1.5 hours, and at the end the temperature is decreased to room temperature.

In a preferred embodiment, the product obtained from step (C) consists essentially of particles having a diameter of 3 to 300 µm, preferably 6 to 200 µm, very preferred 10 to 150 µm.

The temperature of calcination has a significant impact onto the specific surface of the particles comprising at least one compound according to general formula (I) and carbon. Low temperatures during calcination give normally rise to high specific surface area. High temperatures during calcination give usually rise to low specific surface area.

The particles that are obtained from step (C) of the process according to the present invention have in general a specific BET surface area of 0.01 to 50 m$^2$/g, preferably 0.1 to 40 m$^2$/g. The present invention further relates to particles as mentioned abobe obtainable by the process according to the present invention. These particles have characteristics as mentioned above.

Step (C) of the process according to the present invention can be conducted continuously or discontinuously. In a preferred embodiment the process according to the present invention is conducted continuously. Suitable apparatuses for step (C) are known to the person having ordinary skill in the art. One example for a discontinuous or continuous calcination is a rotary furnace. In case of continuous calcination the residence time in a rotary furnace is based on the inclination and the rotating speed of the furnace. A person having ordinary skill in the art does know how a suitable residence time is adjusted in the rotary furnace. In a preferred embodiment the solid that is calcinated in step (C) of the process according to the present invention is moved during calcination, for example in a fluidized bed reactor or in a rotary furnace. The solid can also be stirred during calcination. The rotary furnace can comprise different temperature zones. For example, in a first zone the temperature is adjusted to a low temperature in order to drain the spray dried powder, whereas in another zone a higher calcination temperature is present. The speed of heating of the powder is depending on the temperatures in the different zones and on the speed with which the powder is moved in the furnace.

Step (C) of the process according to the present invention is in general conducted under a pressure that is suitable that preferably complete conversion into the desired products is obtained. In a preferred embodiment step (C) is conducted under a pressure which is slightly higher than atmospheric pressure, in order to prevent oxygen penetrating the reactor from the outside. This slightly increased atmospheric pressure is preferably caused by at least one inert gas that is streaming over the solid compound that is calcinated in this step.

The second process according to the present invention is conducted for the preparation of particles comprising at least one compound according to general formula (I) as defined above and carbon, comprising at least the following steps:

(D) mixing at least one compound according to general formula (I) as defined above with an aqueous solution of at least one polysaccharide comprising glucose having a molecular weight M of at least 50000 g/mol as carbon precursor, (E) drying the mixture provided in step (A), in order to obtain a solid particle and (F) calcining the solid particle obtained from step (E) at a temperature of 300 to 950° C.

The second process according to the present invention gives rise to particles comprising at least one compound according to general formula (I) as mentioned above and carbon. In general carbon is present in the particle according to the second process according to the present invention in nonparticular form. In a preferred embodiment, carbon is predominantly present at the surface of the particles according to the present invention, particularly preferred carbon is present in a layer at the surface having a thickness of up to 20%, preferably up to 10%, of the diameter of the particles. In a preferred embodiment up to 80%, particularly preferred up to 90%, for example up to 95% of the carbon present in the particle, is present in the mentioned layer at the surface of the particle.

In the particles which are prepared by the second process according to the present invention, carbon is present in an amount of from 0.5 to 10% by weight, preferably 1 to 6% by weight, particularly preferred 3 to 5% by weight.

To be specific, the particles which are prepared by the second process according to the present invention comprises at least one compound according to general formula (I)

$$M^1_a M^2_b M^3_c O_o N_n F_f \quad (I)$$

wherein $M^1$, $M^2$, $M^3$ O, N, F, a, b, c, o, n and f have the following meanings:

$M^1$ at least one alkaline metal,
$M^2$ at least one transition metal,
$M^3$ at least one non-metal chosen form S, Se, P, As, Si, Ge and/or B,
O oxygen,
N nitrogen,
F fluorine,
a 0.8-4.2,
b 0.1-1.9,
c 0.8-2.2,
o 1.0-8.4,
n 0-2.0 and
f 0-2.0,
wherein a, b, c, o, n and f are chosen to ensure electroneutrality of the compound according to general formula (I).

In general formula (I) $M^1$ and $M^2$ are metals and $M^3$ is a non-metal chosen from the mentioned group. In addition to the presence of oxygen (O), the compounds according to general formula (I) are preferably sulphates, phosphates, arsenates, silicates, germinate and/or borates.

$M^1$ is at least one alkaline metal, for example chosen from the group consisting of Li, Na, K, Rb, Cs and mixtures thereof, preferably Li, Na and/or K.

$M^2$ is at least one transition metal, for example chosen from the group consisting of Fe, Mn, Ni, Co and mixtures thereof, preferably Fe, Mn, Ni and/or Co.

$M^3$ is at least one non-metal chosen from S, Se, P, As, Si, Ge and/or B, preferably chosen from the group consisting of P, Si, S.

In a preferred embodiment of the present process $M^1$, $M^2$, $M^3$ O, a, b, c, o, n and f in general formula (I) have the following meanings:

$M^1$ Li, and optionally at least one further alkaline metal,
$M^2$ Fe, Mn, Ni and/or Co, and optionally at least one further transition metal,
$M^3$ P, and optionally at least one further non-metal chosen from Si and/or S,
O oxygen,
a 0.8-1.9, particularly preferred 0.9 to 1.1, for example 1.0,
b 0.8-1.9, particularly preferred 0.9 to 1.1, for example 1.0,
c 0.8-1.9, particularly preferred 0.9 to 1.1, for example 1.0,
o 3.0-5.0, particularly preferred 3.5 to 4.5, for example 4.0, and
n, f 0.

In this preferred embodiment, n and f are 0, meaning that no nitrogen (N) and no fluorine (F) is present in the compound according to general formula (I).

For example, in a very preferred embodiment, $M^1$ is Li, $M^2$ is Fe, Mn, Ni and/or Co, $M^3$ is P, and at least one further alkaline metal, at least one further transition metal and at least one further non-metal chosen from Si and/or S are absent, in order to have a neutrally charged compound of general formula (I), for example $LiFePO_4$, in which Fe is in oxidation state +2. Therefore, in a very preferred embodiment, the compound according to general formula (I) is $LiFePO_4$.

In further preferred embodiments, in addition to $M^1$, being for example Li, at least one further alkaline metal, for example Na, is present in an amount of up to 10 mol %, in respect of the sum of $M^1$ and the at least one further alkaline metal. In another preferred embodiment, in addition to $M^2$, being for example Fe, at least one further transition metal, for example Mn, is present in an amount of up to 30 mol %, in respect of the sum of $M^2$ and the at least one further transition metal. In another preferred embodiment, in addition to $M^3$, being for example P, at least one further non-metal chosen from Si and/or S is present in an amount of up to 10 mol %, in respect of the sum of $M^3$ and the at least one further non metal.

In a very preferred embodiment, in the second process according to the present invention, the compound according to general (I) is $LiFePO_4$ or $LiMnPO_4$.

Step (D):

Step (D) of the second process according to the present invention comprises (D) mixing at least one compound according to general formula (I) as defined above with an aqueous solution of at least one polysaccharide comprising glucose having a molecular weight M of at least 50000 g/mol as carbon precursor.

The at least one compound according to general formula (I) that is used in step (D) of this process according to the present invention can be obtained by any process known to the skilled artisan. In particular the solid particle which is used in step (D) is obtained by reaction comprising the respective cations and $PO_4^{3-}$-anions or precursors thereof, optionally in the presence of at least one reducing agent.

Mixing in step (D) can be conducted by any suitable method known to the skilled artisan, for example in a stirred tank reactor, in a preferred embodiment, step (D) is conducted according to step (A) as mentioned above.

In a preferred embodiment, an essentially aqueous solution, dispersion or slurry of at least one compound according to general formula (I) is prepared, and is mixed with an aqueous solution of at least one polysaccharide comprising glucose having a molecular weight M of at least 50000 g/mol as carbon precursor.

Step (E):

Step (E) of the second process according to the present invention comprises (E) drying the mixture obtained in step (D), in order to obtain a solid particle.

Step (E) can be conducted by any suitable method known to the skilled artisan, for example by spray drying, in a preferred embodiment, step (E) is conducted according to step (B) as mentioned above.

Step (F):

Step (F) of the second process of the present invention comprises (F) calcining the solid particle obtained from step (E) at a temperature of 300 to 950° C.

Step (F) can be conducted by any suitable method known to a person having ordinary skill in the art. In a preferred embodiment, step (F) is conducted according to step (C) as mentioned above.

Depending on the composition of the electrode which can be prepared from the particles that are prepared according to the present invention and on the desired electrochemical properties of the resulting lithium-ion battery, it can be advantageous, according to the present application, if the particles obtained from step (B) or (E) are mechanically treated prior to step (D) or (F) and/or if the solid compound obtained from step (C) or (F) is mechanically treated after step (D) or (F), in order to destroy agglomerates into smaller and more dense particles having the required size or into the primary particles. Suitable mills are known to a person having ordinary skill in the art. Examples are jet mills which supply very low abrasion, preferably under the use of nitrogen and/or air. For milling of the calcinated product also wet milling processes may be advantageous, for example by the use of a bead mill. Further suitable apparatuses are compactors and/or rollings.

The present invention further relates to particles, preferably with a spherical morphology, preparable by the process according to the present invention.

These particles, having preferably a spherical morphology, have the characteristic features like diameter and porosity as mentioned above. These particles preferably comprise crystalline primary particles, which preferably show essentially the crystal structure of $LiFePO_4$ and carbon. Analytical methods to detect crystallinity are known to the skilled artisan, for example XRD. Typical available capacities of the materials according to the present invention are in general 120 to 160 Ah/kg, preferably 130 to 158 Ah/kg, very preferably 132 to 155 Ah/kg, at 34 A/kg in each case.

Typical tap density of the material according to present invention is 0.81 to 1.30 g/cm$^3$, preferably 0.82 to 1.10 g/cm$^3$, most preferably 0.83 to 1.05 g/cm$^3$.

These particles with a composition according to general formula (I) preparable by the process according to the present invention show improved crystallinity compared to compounds prepared by processes according to the prior art. In addition the size distribution of the particles obtained is narrower compared to the prior art. The crystallinity of the particles obtained is improved and the solids obtained have an improved dispersion of ingredients. Moreover, the invention enables a significant decrease of the usually applied high calcination temperature of 800° C. and more to prepare a single phase compound of general formula (I), for example lithium-iron-phosphate, comprising carbon, which is preferably present in a layer being present near the surface of the particles. A decrease of the calcination temperature in general leads to a more finely divided material with a very narrow size distribution of the crystallites, supplying improved Li-ion diffusivity in the charging and discharging of a Li-ion battery. By improving the Li-ion diffusivity the power characteristics and additionally the capacity of a Li-ion battery can be increased.

The present invention further relates to particles comprising at least one compound according to general formula (I) as defined above and carbon, wherein carbon is present in the particle in nonparticular form and at the surface of the particles.

Preferably, carbon is present in a layer at the surface having a thickness of up to 20%, preferably up to 10%, of the diameter of the particles. In a preferred embodiment up to 80%, particularly preferred up to 90%, for example up to 95% of the carbon present in the particle, is present in the mentioned layer at the surface of the particle.

The particles according to the present invention are particularly suitable for the use for the preparation of a cathode of a lithium-ion battery or an electrochemical cell. Therefore the present invention also relates to the use of a particle obtainable/preparable by the process according to the present invention for the preparation of a cathode of a lithium-ion battery or an electrochemical cell.

The present invention further relates to a cathode for a lithium-ion battery, comprising at least one particle obtainable/preparable by the process according to the present invention. To obtain a cathode as mentioned above the particle according to the present invention is mixed with at least one electrically conducting material, described for example in WO 2004/082047.

The present invention also relates to a cathode for a lithium-ion battery, comprising particles as mentioned above.

For the preparation of a cathode using the particles according to the present invention and at least one electrically conducting material as mentioned above, in a preferred embodiment the following binders are used:

Polyethyleneoxide (PEO), cellulose, polyethylene, polypropylene, polytetrafluoroethylene, polyacrylonitrile-methylmethacrylate, styrene-butadiene-copolymers, tetrafluoroethylene-hexfluoropropylene-copolymers, polyvinylidenefluoride-hexafluoropropylene-copolymers (PVdF-HFP), perfluoroalkyl-vinylether-copolymers, vinylidenefluoride-chlorotrifluoroethylene-copolymers, ethylene-chlorofluoroethylene-copolymers, ethylene-acrylic acid-copolymers (with and without sodium ions included), ethylene-methacrylic acid (with and without sodium ions included), polyimides and polyisobutene.

The binder is normally added in an amount of 1 to 10% by weight, preferably 2 to 8% by weight, particularly preferred 3 to 7% by weight, in each case based on the whole cathode material.

The present invention is further illustrated by the following examples:

EXAMPLES

Comparative Example 1

Saccharose as Carbon Precursor $LiFePO_4$ from $LiOH+FeOOH+H_3PO_3+H_3PO_4$+saccharose In a 10 L-glass-reactor which is heatable from the outside, 6000 mL water are placed at 90° C. under streaming $N_2$. The streaming $N_2$-cover is maintained during the further process. Under stirring 174.97 g $LiOH.H_2O$ (57.49% LiOH, 4.2 mol Li, Chemetall GmbH, 36679 Langenheim) are added and dissolved. 363.23 g α-FeOOH (61.5% Fe, 4.0 mol Fe, CATHAY PIGMENTS (USA) Inc., 4901 Evans Ave., Valparaiso, Ind. 46383, USA) are added, wherein a yellow suspension is obtained. Subsequently, 167.34 g (2 Mol) $H_3PO_3$ (98%, Fa. Acros Organics, 2440 Geel/Belgium) and 230.58 g $H_3PO_4$ (85%, 2 Mol P, Fa. Bernd Krafft, 47167 Duisburg) are added slowly. To this yellow suspension 115.41 g saccharose are added. Subsequently the suspension obtained is stirred for 2 hours at 90° C. pH of the suspension is 5.7.

The suspension is subsequently spray-dried under nitrogen in a spray-dryer (type Minor MM, Niro, Danmark) (temperature at the inlet=330° C., temperature at the outlet=103 to 108° C.).

The powder obtained from spray drying is subsequently added to a continuously rotating (7 rpm) 1 L-quartz glass bubble under streaming nitrogen (15 NL/h) in a laboratory rotary furnace (BASF SE) and heated in one hour to a temperature of 300 to 750° C., is hold at this temperature for one hour. The calcinated powder is subsequently cooled to room temperature under streaming $N_2$.

Comparative Example 2

Saccharose as Carbon Precursor $LiFePO_4$ from $LiOH+FeOOH+H_3PO_3+H_3PO_4$+saccharose In a 10 L-glass-reactor which is heatable from the outside, 6000 mL water are placed at 90° C. under streaming $N_2$. The streaming $N_2$-cover is maintained during the further process. Under stirring 174.97 g $LiOH.H_2O$ (57.49% LiOH, 4.2 mol Li, Chemetall GmbH, 36679 Langenheim) are added and dissolved. 363.22 g α-FeOOH (61.5% Fe, 4.0 mol Fe, CATHAY PIGMENTS (USA) Inc., 4901 Evans Ave., Valparaiso, Ind. 46383, USA) are added, wherein a yellow suspension is obtained. Subsequently, 167.34 g (2 Mol) $H_3PO_3$ (98%, Fa. Acros Organics, 2440 Geel/Belgium) and 230.58 g $H_3PO_4$ (85%, 2 Mol P, Fa. Bernd Krafft, 47167 Duisburg) are added slowly. To this yellow suspension 180.33 g saccharose are added. Subsequently the suspension obtained is stirred for 2 hours at 90° C. pH of the suspension is 5.7.

The suspension is subsequently spray-dried under nitrogen in a spray-dryer (type Minor MM, Niro, Danmark) (temperature at the inlet=330° C., temperature at the outlet=103 to 108° C.).

The powder obtained from spray drying is subsequently added to a continuously rotating (7 rpm) 1 L-quartz glass bubble under streaming nitrogen (15 NL/h) in a laboratory rotary furnace (BASF SE) and heated in one hour to a temperature of 300 to 750° C., is hold at this temperature for one hour. The calcinated powder is subsequently cooled to room temperature under streaming $N_2$.

Comparative Example 3

Lactose as Carbon Precursor $LiFePO_4$ from $LiOH+FeOOH+H_3PO_3+H_3PO_4$+lactose In a 10 L-glass-reactor which is heatable from the outside, 6000 mL water are placed at 90° C. under streaming $N_2$. The streaming $N_2$-cover is maintained during the further process. Under stirring 177.72 g $LiOH.H_2O$ (56.6% LiOH, 4.2 mol Li, Chemetall GmbH, 36679 Langenheim) are added and dissolved. 354.58 g α-FeOOH (63% Fe, 4.0 mol Fe, CATHAY PIGMENTS (USA) Inc., 4901 Evans Ave., Valparaiso, Ind. 46383, USA) are added, wherein a yellow suspension is obtained. Subsequently, 165.49 g (2 Mol) $H_3PO_3$ (99.1%, Fa. Acros Organics, 2440 Geel/Belgium) and 230.58 g $H_3PO_4$ (85%, 2 Mol P, Fa. Bernd Krafft, 47167 Duisburg) are added slowly. To this yellow suspension 136.85 g lactose are added. Subsequently the suspension obtained is stirred for 2 hours at 90° C. pH of the suspension is 5.4.

The suspension is subsequently spray-dried under nitrogen in a spray-dryer (type Minor MM, Niro, Danmark) (temperature at the inlet=330° C., temperature at the outlet=103 to 108° C.).

The powder obtained from spray drying is subsequently added to a continuously rotating (7 rpm) 1 L-quartz glass bubble under streaming nitrogen (15 NL/h) in a laboratory rotary furnace (BASF SE) and heated in one hour to a temperature of 700 to 850° C., is hold at this temperature for one hour. The calcinated powder is subsequently cooled to room temperature under streaming $N_2$.

Example 1

30% by Weight Amylopectin and 70% by Weight Saccharose $LiFePO_4$ from $LiOH+FeOOH+H_3PO_3+H_3PO_4$+amylopectin+saccharose In a 10 L-glass-reactor which is heatable from the outside, 6000 mL water are placed at 90° C. under streaming $N_2$. The streaming $N_2$-cover is maintained during the further process. Under stirring 177.72 g $LiOH.H_2O$ (56.6% LiOH, 4.2 mol Li, Chemetall GmbH, 36679 Langenheim) are added and dissolved. 354.58 g α-FeOOH (63% Fe, 4.0 mol Fe, CATHAY PIGMENTS (USA) Inc., 4901 Evans Ave., Valparaiso, Ind. 46383, USA) are added, wherein a yellow suspension is obtained. Subsequently, 165.49 g (2 Mol) $H_3PO_3$ (98%, Fa. Acros Organics, 2440 Geel/Belgium) and 230.58 g $H_3PO_4$ (85%, 2 Mol P, Fa. Bernd Krafft, 47167 Duisburg) are added slowly. To this yellow suspension 230.58 g amylopectin (Prevalent EH 92-527-1, BASF SE) and 106.80 g saccharose are added. Subsequently the suspension obtained is stirred for 2 hours at 90° C. pH of the suspension is 5.4.

The suspension is subsequently spray-dried under nitrogen in a spray-dryer (type Minor MM, Niro, Danmark) (temperature at the inlet=330° C., temperature at the outlet=103 to 108° C.).

The powder obtained from spray drying is subsequently added to a continuously rotating (7 rpm) 1 L-quartz glass bubble under streaming nitrogen (15 NL/h) in a laboratory rotary furnace (BASF SE) and heated in one hour to a temperature of 700 to 850° C., is hold at this temperature for one hour. The calcinated powder is subsequently cooled to room temperature under streaming $N_2$.

Example 2

50% by Weight Amylopectin and 50% by Weight Saccharose $LiFePO_4$ from $LiOH+FeOOH+H_3PO_3+H_3PO_4$+amylopectin+saccharose In a 10 L-glass-reactor which is heatable from the outside, 6000 mL water are placed at 90° C. under streaming $N_2$. The streaming $N_2$-cover is maintained during the further process. Under stirring 168.18 g $LiOH.H_2O$ (58.1% LiOH, 4.08 mol Li, Chemetall GmbH, 36679 Langenheim) are added and dissolved. 354.58 g α-FeOOH (63% Fe, 4.0 mol Fe, CATHAY PIGMENTS (USA) Inc., 4901 Evans Ave., Valparaiso, Ind. 46383, USA) are added, wherein a yellow suspension is obtained. Subsequently, 165.49 g (2 Mol) $H_3PO_3$ (98%, Fa. Acros Organics, 2440 Geel/Belgium) and 230.58 g $H_3PO_4$ (85%, 2 Mol P, Fa. Bernd Krafft, 47167 Duisburg) are added slowly. To this yellow suspension 70.00 g amylopectin (Prevalent EH 92-527-1, BASF SE) and 65.00 g saccharose are added. Subsequently the suspension obtained is stirred for 2 hours at 90° C. pH of the suspension is 5.4.

The suspension is subsequently spray-dried under nitrogen in a spray-dryer (type Minor MM, Niro, Danmark) (temperature at the inlet=330° C., temperature at the outlet=103 to 108° C.).

The powder obtained from spray drying is subsequently added to a continuously rotating (7 rpm) 1 L-quartz glass bubble under streaming nitrogen (15 NL/h) in a laboratory rotary furnace (BASF SE) and heated in one hour to a temperature of 700 to 850° C., is hold at this temperature for one hour. The calcinated powder is subsequently cooled to room temperature under streaming $N_2$.

Example 3

80% by Weight Amylopectin and 20% by Weight Saccharose $LiFePO_4$ from $LiOH+FeOOH+H_3PO_3+H_3PO_4$+amylopectin+saccharose In a 10 L-glass-reactor which is heatable from the outside, 6000 mL water are placed at 90° C. under streaming $N_2$. The streaming $N_2$-cover is maintained during the further process. Under stirring 168.18 g LiOH $H_2O$ (58.1% LiOH, 4.08 mol Li, Chemetall GmbH, 36679 Langenheim) are added and dissolved. 354.58 g α-FeOOH (63% Fe, 4.0 mol Fe, CATHAY PIGMENTS (USA) Inc., 4901 Evans Ave., Valparaiso, Ind. 46383, USA) are added, wherein a yellow suspension is obtained. Subsequently, 165.49 g (2 Mol) $H_3PO_3$ (98%, Fa. Acros Organics, 2440 Geel/Belgium) and 230.58 g $H_3PO_4$ (85%, 2 Mol P, Fa. Bernd Krafft, 47167 Duisburg) are added slowly. To this yellow suspension 112.00 g amylopectin (Prevalent EH 92-527-1, BASF SE) and 51.20 g saccharose are added. Subsequently the suspension obtained is stirred for 2 hours at 90° C. pH of the suspension is 5.4.

The suspension is subsequently spray-dried under nitrogen in a spray-dryer (type Minor MM, Niro, Danmark) (temperature at the inlet=330° C., temperature at the outlet=103 to 108° C.).

The powder obtained from spray drying is subsequently added to a continuously rotating (7 rpm) 1 L-quartz glass bubble under streaming nitrogen (15 NL/h) in a laboratory rotary furnace (BASF SE) and heated in one hour to a temperature of 700 to 850° C., is hold at this temperature for one hour. The calcinated powder is subsequently cooled to room temperature under streaming $N_2$.

Example 4

100% Amylopectin $LiFePO_4$ from $LiOH+FeOOH+H_3PO_3+H_3PO_4$+amylopectin

In a 10 L-glass-reactor which is heatable from the outside, 6000 mL water are placed at 90° C. under streaming $N_2$. The streaming $N_2$-cover is maintained during the further process. Under stirring 174.97 g $LiOH.H_2O$ (57.49% LiOH, 4.2 mol Li, Chemetall GmbH, 36679 Langenheim) are added and dissolved. 363.23 g α-FeOOH (61.5% Fe, 4.0 mol Fe, CATHAY PIGMENTS (USA) Inc., 4901 Evans Ave., Valparaiso, Ind. 46383, USA) are added, wherein a yellow suspension is obtained. Subsequently 167.34 g (2 Mol) $H_3PO_3$ (98%, Fa. Acros Organics, 2440 Geel/Belgium) and 230.58 g $H_3PO_4$ (85%, 2 Mol P, Fa. Bernd Krafft, 47167 Duisburg) are added slowly. To this yellow suspension 180.33 g amylopectin (Prevalent EH 92-527-1, BASF SE) are added. Subsequently the suspension obtained is stirred for 2 hours at 90° C. pH of the suspension is 5.6.

The yellow is subsequently spray-dried under nitrogen in a spray-dryer (type Minor MM, Niro, Danmark) (temperature at the inlet=330° C., temperature at the outlet=103 to 108° C.).

The powder obtained from spray drying is subsequently added to a continuously rotating (7 rpm) 1 L-quartz glass bubble under streaming nitrogen (15 NL/h) in a laboratory rotary furnace (BASF) and heated in one hour to a temperature of 300 to 750° C., is hold at this temperature for one hour and is subsequently cooled to room temperature under streaming $N_2$.

The materials obtained form the mentioned examples and comparative examples have been analysed in respect of their amount of carbon present, tap density and capacity. The amount of carbon, tap density and capacity have been acquired by methods known to the skilled artisan. The results are shown in table 1.

TABLE 1

| | Analytical data | | | | |
|---|---|---|---|---|---|
| | Calcination Temperature [° C.] | Carbon-precursor | Amount of carbon [%] | Tap-density [g/cm$^3$] | Available capacity [Ah/kg] at 34 A/kg] |
| Comparative example 1 | 700 | saccharose | 3.7 | 0.77 | 149 |
| | 750 | saccharose | 3.4 | 0.78 | 139 |
| Comparative example 2 | 700 | saccharose | 5.6 | 0.73 | 144 |
| | 750 | saccharose | 5.1 | 0.73 | 143 |
| Comparative example 3 | 700 | lactose | 4.1 | 0.77 | — |
| | 750 | lactose | 3.8 | 0.80 | |
| Example 1 | 700 | 30% amyolpectin/ 70% saccharose | 4.4 | 0.78 | 139 |
| | 750 | 30% amyolpectin/ 70% saccharose | 3.9 | 0.78 | 140 |
| Example 2 | 700 | 50% amyolpectin/ 50% saccharose | 4.2 | 1.01 | 154 |
| | 750 | 50% amyolpectin/ 50% saccharose | 3.9 | 0.98 | 151 |
| Example 3 | 750 | 80% amyolpectin/ 20% saccharose | 4.6 | 0.97 | 135 |
| Example 4 | 700 | amylopectin | 3.8 | 0.83 | — |
| | 750 | amylopectin | 3.4 | 0.86 | — |
| Example 5 | 700 | amylopectin | 5.4 | 1.00 | 142 |
| | 750 | amylopectin | 5.4 | 1.04 | 143 |

The invention claimed is:
1. A process for producing a particle, the process comprising:
(B) drying an essentially aqueous mixture to obtain a solid particle, the mixture comprising:
a first compound comprising $M^1$;
a second compound comprising $M^2$ and having an oxidation state at least partially higher than +2;
optionally, a third compound comprising $M^3$;
optionally, at least one selected from the group consisting of a fourth compound comprising N and a fifth compound comprising F;
a polysaccharide comprising glucose and having a molecular weight of at least 50000 g/mol;
at least one of a monosaccharide and a disaccharide; and
at least one reducing agent selected from the group consisting of hydrazine, a hydrazine derivative, a hydroxyl amine, a hydroxyl amine derivative, a reducing sugar, an alcohol, ascorbic acid, a compound comprising an oxidizable double bond, and a compound comprising a phosphorous atom having an oxidation state of +3; and

(C) calcining the solid particle at a temperature of 300 to 950° C.;

wherein:

the solid particle comprises carbon and a compound of formula (I):

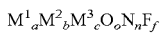  (I), wherein:

$M^1$ is at least one alkaline metal;

$M^2$ is at least one transition metal having an oxidation state of +2;

$M^3$ is at least one non-metal selected from the group consisting of S, Se, P, As, Si, Ge, and B;

O is oxygen, N is nitrogen, F is fluorine; and a is 0.8-4.2, b is 0.8-1.9, c is 0.8-2.2, o is 1.0-8.4, n is 0-2.0, and f is 0-2.0;

the compound of formula (I) is electroneutral;

the polysaccharide is present in an amount of 40-85% by weight based on a total weight of the polysaccharide and the at least one of the monosaccharide and the disaccharide; and the at least one of the monosaccharide and the disaccharide is present in an amount of 15-60% by weight based on the total weight of the polysaccharide and the at least one of the monosaccharide and the disaccharide.

2. The process of claim 1, wherein, in formula (I), $M^1$ is Li, and optionally, at least one further alkaline metal, $M^2$ is at least one selected from the group consisting of Fe, Mn, Ni, and Co, and optionally, at least one further transition metal, $M^3$ is P, and optionally, at least one non-metal selected from the group consisting of Si and S, O is oxygen, a is 0.8-1.9, b is 0.8-1.9, c is 0.8-1.9, o is 3.0-5.0, n is 0, and f is 0.

3. The process of claim 1, wherein the compound of formula (I) is $LiFePO_4$.

4. The process of claim 1, wherein the compound of formula (I) is $LiMnPO_4$.

5. The process of claim 1, wherein the compound of formula (I) is $LiNiPO_4$.

6. The process of claim 1, wherein the compound of formula (I) is $LiCoPO_4$.

7. The process of claim 1, wherein the at least one reducing agent is water-soluble.

8. The process of claim 1, wherein at least one reducing agent is carbon-free.

9. The process of claim 1, wherein the drying is carried out by spray-drying.

10. The process of claim 1, wherein the carbon is present in a layer at a surface of the particle having a thickness of up to 20% of a diameter of the particle.

* * * * *